United States Patent [19]
Person et al.

[11] 3,919,493
[45] Nov. 11, 1975

[54] TELEPHONE RINGING CIRCUIT

[76] Inventors: Jean-Michel Person, Rue du Parc St. Jacques; Gerard J. P. Pays, Rue de Lanneg Braz; Jean-Michel A. Garnier, Rue Jean Moulin, all of Perros-Guirec, France

[22] Filed: June 3, 1974

[21] Appl. No.: 476,064

[30] Foreign Application Priority Data

June 28, 1973 France .............................. 73.23710

[52] U.S. Cl. .............................................. 179/84 R
[51] Int. Cl.[2] .............................................. H04M 1/26
[58] Field of Search.. 179/84 T, 84 R, 81 R, 84 VF, 179/84 A

[56] References Cited

UNITED STATES PATENTS

| | | | |
|---|---|---|---|
| 3,471,651 | 10/1969 | Saia | 179/84 A |
| 3,536,852 | 10/1970 | Dolamore | 179/84 R |
| 3,539,732 | 11/1970 | Weissenberg | 179/84 R |
| 3,603,740 | 9/1971 | Cambridge | 179/84 VF |
| 3,688,038 | 9/1972 | Hwgyecz | 179/84 R |

*Primary Examiner*—Kathleen H. Claffy
*Assistant Examiner*—Joseph Popek
*Attorney, Agent, or Firm*—Abraham A. Saffitz

[57] ABSTRACT

The device according to the invention relates to a telephone ringing circuit comprising the combination of a rectifier for an alternating call signal, an energy storing circuit including a capacitor fed by the rectifier, an electro-acoustic transducer, a switch series-connected to the capacitor and to said transducer in such a manner as to form a discharge circuit for the capacitor when the switch is closed, and an electronic acoustic-frequency oscillator fed by the rectifier which controls at its own frequency the switching of the switch.

The switch may be a thyristor and the electro-acoustic transducer may be a loudspeaker.

This device permits the subscriber to adjust the frequency and the sound level of the telephone ringing.

4 Claims, 4 Drawing Figures

TELEPHONE RINGING CIRCUIT

BACKGROUND OF THE INVENTION 1. (a) Field Of The Invention

The present invention relates to a telephone ringing system capable of converting an electric alternating low-frequency signal, such as a signal with a frequency lower than or equal to 50 Hz, into a more audible sound signal capable of being transmitted to a small transducer.

2. Description Of The Prior Art

Most of the known desired used in telephone sets are almost entirely electro-mechanical; an electric alternating low-frequency current supplied by a call generator flows through the winding of an electromagnet and this gives rise to an alternating movement of a magnetic reed. This reed in turn drives a moving hammer which strikes a bell or a small bell or any other mechanical resonator giving the disired sound upon being struck by the hammer at the rate of the alternating current.

This arrangement has several disadvantages:

Firstly, the consumption of electric power is relatively high; also since it is necessary to move metal parts, most of the required energy is lost due to friction or the Joule effect. The efficiency of these telephone ringers, which is given by the ratio between the radiated acoustic power and the consumed electric power, is generally lower than one thousandth.

Secondly, the dimensions of the sound source (bell, small bells, etc.,) become of importance if a great acoustic efficiency is required or if a signal having low frequencies is desired, especially since such frequencies give a more pleasant tonality and are more easily propagated through partitions of houses or buildings.

Thirdly, the sound level and frequency cannot be readily adjusted, the frequency in particular depending upon the characteristic frequencies of the resonators.

Another known device in the prior art comprises an electro-acoustic ring for telephone systems which uses the current of the call signal transmitted through the line. This signal is rectified in order to be applied to a transistor which controls a loud-speaker, this transistor being alternatively switched to the frequency of the call signal by the half-waves of this signal.

It is also known to make use of a call device comprising an electro-mechanic transducer. The current of the call signal is rectified and charges a capacitor which discharges into the coil of a transducer controlled by a thyristor. This in turn is controlled by a circuit which is series-connected to the capacitor and the coil.

Finally it is also known to use an electro-acoustic call device comprising a special electro-acoustic microphone. This microphone is energized by a low-frequency oscillator having an oscillating circuit which comprises the coil of the microphone and a capacitor.

In the latter three solutions, it is very difficult to control separately the level and frequency of the electric pulses applied to the transducer.

SUMMARY OF THE INVENTION

According to the present invention there is provided a telephone ringing comprising a rectifier for an alternating call signal, an energy storing circuit including a capacitor fed by the rectifier, a switch series-connected to the capacitor and a transducer in such a manner as to form a discharge circuit for the capacitor when the switch is closed, and an electronic acoustic frequency oscillator fed by the rectifier which controls at its own frequency the switching of the switch.

It has been found possible to use a small electro-acoustic transducer having a low electric impedance for high sound levels by applying to it electric pulses of large amplitude (a few volts to a few tens of volts), which are also very short, in order to avoid any overloading. The level and the rate of the pulses are then parameters which are controlled for obtaining a call device which is efficient and adjustable. An electrical device equivalent to the known hammer or bell systems can thus be provided, wherein a finite amount of energy is abruptly transmitted to the sound radiating system (small bell or diaphragm) upon the shock being struck. The electrical energy abruptly developed in the transducer is progressively stored by means of a capacitor which is charged by the electrical source generating the usual alternating low-frequency call signal, this capacitor then discharging in the transducer.

The device according to the invention can be considered as comprising three circuits:

The first circuit is designed to rectify the alternating current of the call signal in order to suitably feed the electronic circuits carrying out other functions. The second circuit withdraws from the obtained direct current source a determined amount of power which is nearly constant and is designed to store energy that can be then suddenly released at a desired time in the transducer. The third circuit produces the timed signal which controls the generation in the transducer, in the form of short pulses, of the energy progressively stored by the second circuit.

BRIEF DESCRIPTION OF THE DRAWING

The present invention will now be described in more detail, by way of example only with reference to the accompanying drawings, in which.

DESCRIPTION OF THE PREFERRED EMBODIMENT

In all these Figures the same reference numbers have been used for the same elements.

Figure 1:
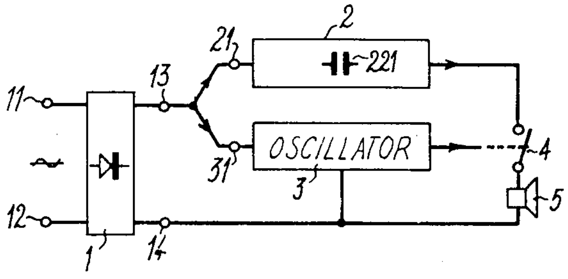
FIG. 1 is a block diagram of an electro-acoustic device.

In FIG. 1, an alternating call signal is applied to terminals 11 and 12 of a rectifying device 1. The latter feeds an energy storing device 2 and an oscillator 3.

This oscillator controls at a desired rate a switch 4 which allows the electric energy of the device 2 to be released and applied to the electro-acoustic transducer 5. The switch 4 is preferably an electronic switch, which avoids all movement of any elements except the moving membrane of the transducer. This transducer can be a loudspeaker.

The embodiments of the various circuits can vary depending upon the results desired by the user as far as the sound level, the spectrum composition, adjustment possibilities etc., are concerned.

In the preferred embodiment of the inveniton, the results of a large number of tests intended to define the efficiency and comfort principles of electronic ringings for telephone apparatus or sets, were taken into account by using one or a multiplicity of conventional handsets as a transducer.

According to these tests, the efficiency is satisfactory when the radiated acoustic power is of the order of 1 milliwatt. The sonority is satisfactory when the pulses applied to the transducer are regularly spaced from one another with a period ranging from 0.5 to 4 milliseconds and have a uniform amplitude; actually it is of no use for comfort and efficiency to vary the instantaneous amplitude or frequency by means of a perceptible frequency modulation. It is important instead for the user to be in a position of adjusting the sound level radiated by the transducer.

Figure 2:
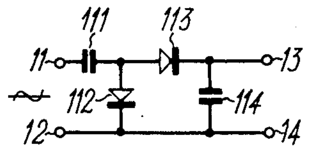
FIG. 2 shows an embodiment of the rectifying circuit of the device shown in FIG. 1.

In a preferred embodiment, the rectifying circuit 1 of FIG. 1 is based on the known features of "voltage doubler" of the arrangement shown in FIG. 2. This arrangement is particularly suitable for telephone exchanges. It comprises two diodes 112 and 113 and two capacitors 111 and 114. The capacitor 111 prevents the D.C. supply voltage of the exchange from emitting the sound signal. On the other hand, the D.C. voltage across 13 and 14 is equal to twice the amplitude of the alternating call signal. By taking into account the low direct current consumed by the remaining part of the arrangement, a correct operation for a wide range of amplitudes of the alternating call current can be ensured. The capacitor 114 filters the alternating components resultiung from the rectification.

Figure 3:
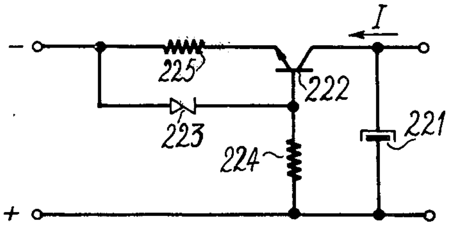
FIG. 3 shows an embodiment of the circuit storing the energy of the device of FIG. 1.

FIG. 3 is a diagram of the energy storing circuit 2 of FIG. 1. A capacitor 221 is charged by a constant current supplied thereto by a transistor 222, a Zener diode 223 and resistors 224 and 225. The current charging the capacitor is approximately given by the relationship:

$$I = \frac{VZ\ V_{BE}}{R_E}$$

where $V_Z$ is the voltage across the terminals of the diode 223;

$V_{BE}$ is the voltage drop across the emitter-base circuit of the transistor T in the conducting state;

$R_E$ is the value of the resistor 225 connected to the emitter of the transistor 222.

Figure 4:
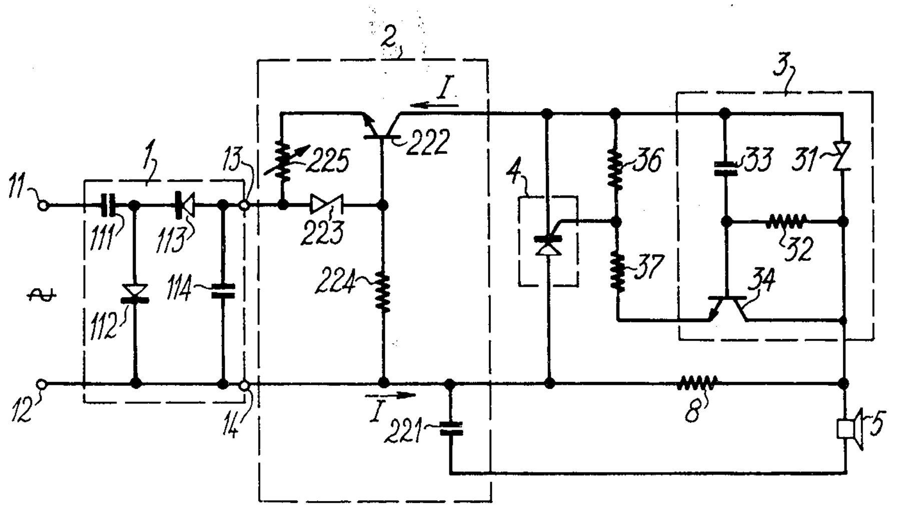
FIG. 4 shows an embodiment of the electro-acoustic device of FIG. 1.

FIG. 4 illustrates a complete arrangement of a preferred embodiment of the invention.

The blocks 1, 2, 3, 4, 5, of the diagram of FIG. 1 can be seen similarly referenced. The switch 4 is a "thyristor" switch.

The operation of this arrangement is as follows:

During the period when the switch 4 is open (the thyristor 4 does not allow any current to flow), the current I supplied by the current generator comprising the elements 222 to 225 charges the capacitor 221 and then flows to the transducer 5 and the diode 31 of the oscillator 3. Across the terminals of this diode 31 which is of the "Zener diode" type, there also appears a constant voltage $U_Z$, which is designed to charge the capacitor 33 via the resistor 32. The voltage across the terminals of capacitor 33 increases with time and reaches a level sufficient for rendering the transistor 34 conducting. The latter then absorbs a part of the current I and causes a current to flow through the resistors 36 and 37 in its collector-emitter circuit. When the voltage across the terminals of 36 reaches a sufficient value, the thyristor 4 suddenly becomes conducting and allows the capacitor 221 to be discharged across the transducer 5 through the thyristor circuit 4, diode 31, transducer 5, and capacitor 221. Said discharge current also flows through the diode 31 across the terminals of which there occurs a voltage of opposite sign and of a value much lower than the voltage $U_Z$. This causes the capacitor 33 to be discharged through the base-emitter circuit of the transistor 34. Upon the end of the discharge of the capacitor 221, capacitor 33 is discharged. The switch 4 becomes non-conducting again and the same cycle can re-start.

It should be noted that the frequency of the control pulses of the switch 4 in a first approximation depends exclusively upon $U_Z$, the control voltage of the thyristor 4 and the values of the elements 32, 33, 36, 37. On the other hand, the energy of the pulses applied to the transducer 5 depends only upon the current flowing through transistor 22, i.e.: I. The variable resistor 225 upon which I depends allows the energy of the pulses to be varied independently of the frequency; this causes the acoustic power of the generated signal to be varied without changing its frequency or its tone.

The resistor 8, the value of which does not substantially modify the performance of the device, improves its operational stability.

What we claim is:

1. A ringing device in a telephone subset comprising:

an A.C. ringing source;

a rectifier having positive and negative output terminals for rectifying the current of said source;

an energy storing capacitor;

a low frequency oscillator having a characteristic period;

an electronic switch controlled by said oscillator having a closed and an open state;

an electro-acoustic transducer;

a charging circuit connected to said rectifier output terminals for charging said energy storing capacitor; and, said switch, capacitor, and transducer constituting a circuit for discharging said capacitor through said electronic switch when in its closed state whereby the energy of said capacitor is transferred to said transducer.

2. A ringing device as claimed in claim 1 further comprising a voltage divider having two serially connected resistances connected across said oscillator and wherein said electronic switch is provided with a gate, the gate of said switch being connected to the junction point of said serially connected resistances.

3. A ringing device as claimed in claim 1 wherein said electronic switch is a thyristor.

4. A ringing device as claimed in claim 1 wherein said transducer is a loudspeaker.

* * * * *